United States Patent [19]

Chisholm

[11] E Patent Number: Re. 33,401

[45] Reissued Date of Patent: Oct. 23, 1990

[54] MICROWAVE LANDING SYSTEM

[75] Inventor: John P. Chisholm, Reno, Nev.

[73] Assignee: Sundstrand Data Control, Inc., Redmond, Wash.

[21] Appl. No.: 286,721

[22] Filed: Dec. 19, 1988

Related U.S. Patent Documents

Reissue of:

[64] Patent No.: 4,635,064
Issued: Jan. 6, 1987
Appl. No.: 719,849
Filed: Apr. 4, 1985

[51] Int. Cl.[5] ..... G01S 1/16
[52] U.S. Cl. ..... 342/408; 342/435
[58] Field of Search ..... 342/407, 408, 410, 35; 364/427, 428, 433

[56] References Cited

U.S. PATENT DOCUMENTS

| | | | |
|---|---|---|---|
| 4,306,238 | 12/1981 | Enein | 342/408 |
| 4,306,239 | 12/1981 | Enein | 342/408 |
| 4,333,081 | 6/1982 | Hofgen | 342/408 |
| 4,429,312 | 1/1984 | Chisholm | 342/410 |

OTHER PUBLICATIONS

Microwave Landing System—The New International Standard, Redlien & Kelly, Bendix Corp.—Advances in Electronics & Electron Physics, vol. 57, pp. 311–410.

*Primary Examiner*—Thomas H. Tarcza
*Assistant Examiner*—David Cain
*Attorney, Agent, or Firm*—Michael S. Yatsko; Trevor B. Joike

[57] ABSTRACT

The invention provides independent guidance and monitoring to be integrated into an MLS landing system and also provides a scaled-down MLS landing guidance system useable at small airports. In both cases an added fixed beam precision guidance system is integrated into the MLS time sequence format. The fixed beam guidance system is based upon the concept of using paired fixed overlapping beams, sequentially radiated by different fixed antennas. One pair is oriented to left and right of the centerline of the runway, and the other pair is oriented above and below the desired glideslope. The first set of paired beams overlap at the centerline of the runway in such a manner that an aircraft approaching exactly on centerline will intercept equal signal intensities to indicate an on-course approach. Conversely when the aircraft is off-course to one side of the centerline, it will intercept a stronger signal intensity for the fixed guidance beam which is directed to that side of the centerline and a weaker signal intensity for the fixed beam which is directed to the other side of the centerline. Similar operation is provided by the overlapped guidance beams operating in the elevation mode.

49 Claims, 9 Drawing Sheets

MICROWAVE LANDING SYSTEM

Matter enclosed in heavy brackets [ ] appears in the original patent but forms no part of this reissue specification; matter printed in italics indicates the additions made by reissue.

BACKGROUND AND PRIOR ART

For many years the airports have been equipped with the Instrument Landing System known as the ILS. However, this landing system is about to be replaced by a new Microwave Landing System, known as the MLS which has recently received virtually worldwide acceptance. The first order for the ground portion of the system MLS has recently been placed by the FAA.

In view of the essential nature of aircraft landings, often considered to be the most critial of ordinary maneuvers, it is important to have a monitoring and backup system that provides an independent check during in-flight approaches to insure the absolute reliability of the data being provided by the principal landing system. This would be in addition to the usual ground based monitors which are used for checking course alignments, signal strengths, etc. of the signals radiated from the ground based landing system components. In the aircraft, other types of navigation techniques are constantly in use to check on the accuracy of the landing system, but none provides the high degree of reliability required during final approach.

One possible technique for providing an independent landing monitor system (ILM) for the critical landing operation is to provide a duplicate ground installation and to compare in the aircraft the guidance data provided by both ground facilities and if such data agrees within prescribed limits to proceed with the landing.

In ILS systems, it has been impractical to provide a second identical ILS as a back-up monitor at the same airport, principally because of the large size of the ILS antennas. Moreover, even though the antennas are much smaller in MLS systems because of the higher frequencies used, about 5000 MHz, it would be impractical to provide a second identical MLS at the same airport, because of the very high cost of the MLS systems, about $500,000 each.

A second ILM technique is to use airborne equipment already installed for other purposes to provide landing guidance data for such independent monitoring purposes.

The weather radar, either modified or unmodified and in cooperation with gound-based reflectors or beacons, has frequently been suggested for implementing an ILM, especially since weather radar is used when flying under bad weather (IFR) conditions.

This weather radar ILM concept is taught in my U.S. Pat. No. 3,243,816, which uses the airborne weather radar together with ground installed passive reflectors or alternatively with radar beacons of the frequency shift type, to display guidance paths for landing, or for landing monitoring purposes.

More recently, Assam in his U.S. Pat. No. 3,729,737 added a further teaching involving the detecting, by means of airborne radar, of plural tilted reflectors to generate glideslope guidance patterns for ILM purposes.

Gendreu et al in U.S. Pat. No. 4,103,300 suggests the use of weather radar and a ground beacon system for ILM purposes. However, his technique tends to require complex airborne instrumentation and therefore cannot use a standard weather radar, which is a major drawback.

My U.S. Pat. No. 4,429,312 overcomes the problems of requiring a non-standard weather radar by using a standard weather radar beacon for ILM purposes in a time sequence mode of operation.

The problem with all of the above noted weather radar uses for ILM purposes is that they require the use of a weather radar which may not be installed on all aircraft of interest. What is required then is an ILM that provides a completely independent monitoring function which is integrated within the framework of the landing guidance system that is being monitored and which does not require the installation of added airborne equipment. In particular this invention seeks to provide this type of ILM capability in the present worldwide standard MLS landing system.

An ILM for monitoring the progress of each landing at an MLS site is therefore desirable, whereby an aircraft can obtain truly independent confirmation of the MLS guidance data from ILM ground equipment which is integrated with the MLS ground equipment. In such a system the airborne derived ILM data will be truly independent, but can be based upon the use of the already installed MLS airborne equipment without requiring added airborne equipment.

MLS is a sequentially functioning system which can provide up to 15 different functions at different times in the MLS radiating sequence. These functions can be divided into two separate categories, one category providing guidance, and the other category providing to the aircraft data relating to that particular MLS installation, i.e. location of MLS equipment with respect to the runway, equipment status, type of services provided, etc. The MLS signal format currently includes both an auxiliary guidance function, and an auxiliary data function (not yet fully specified). These auxiliary unspecified functions are to accommodated future growth of the MLS system.

MLS is also a very flexible system wherein at some installations, as for example at a very busy airport, essentially all functions may be provided, whereas at smaller airports only some functions may be provided.

Each MLS function, when it is provided, i.e. radiated, is accompanied by an associated preamble identification code. Since each function has such an identification code, the functions can be radiated or provided at different or randomly selected times, not necessarily in any particular sequence. Specific sequences are however recommended in the ICAO SARPS (Standards and Recommended Practices) for installations that provide a particular combination of functions. In addition each particular function must be radiated at a certain minimum repetition rate consistent with the service that function performs, i.e. azimuth approach guidance must be provided at a rate consistent with aircraft/pilot response for a desired guidance performance.

The precision guidance functions of the MLS are provided by means of a narrow beam that scans the region in which precision guidance is being provided. The time between successive passages of the scanning guidance beams past the airborne receiving antenna is precisely measured by the airborne precision timing circuit and used to provide the desired angular guidance data.

The purpose of using scanned beams for localizer and elevation determinations in MLS, as distinguished from fixed beams as used in ILS, is to permit the approach and landing of aircraft along nonlinear courses having greater flexibility than straight-line paths, i.e. permitting curved azimuth and elevation approaches which are deemed especially useful at high traffic airports. Although a curved approach path may be useful at som e distance from touchdown, in order to be more certain of a safe landing, the aircraft will usually fly the last, most critial, portion of the approach to touchdown along the usual non-maneuvering straight-line centerline course. Moreover, during most approaches, the aircraft will still follow a relatively standard straight-line glidepath, typically a 3° glideslope which is the same as used in ILS landings, prior to touchdown.

In addition to the use or radiation of the scanning beam to provide precision guidance, the MLS guidance function may also include the use of sequentially radiated fixed beams.

These fixed beams serve two separate purposes. One purpose termed OCI (out of course indication) is to suppress false courses outside the established MLS guidance region. These false courses might be caused by side lobes of the precision scanning beams. False course suppression is accomplished by radiating one or more fixed beams that provide greater signal strength, by a prescribed amount, than the side lobes of the scanning beam in the area in which it is desired to suppress possible false guidance courses. Up to six false course suppression beams can be radiated within the azimuth guidance function and up to two within the elevation guidance fuction.

The second purpose of using radiated fixed beams is to provide a clearance capability. Clearance beams are used in the MLS installations where the azimuth scanning beam does not scan the entire, normally prescribed, precision azimuth guidance region of plus of minus 40° about the runway centerline, but scans only a portion of that region. In such installations these clearance beams are radiated left and right of the scanning beam precision coverage, but within the specified guidance coverage region. Measurement of the amplitudes of such beams will provide a fly/left, fly/right signal for use in the aircraft for intercepting the region in which precision proportional guidance is provided by the scanning beam. Both the OCI and the clearance beams are radiated at prescribed times within the time allocated to the guidance function within which they might be utilized.

It can be noted therefore that MLS is a sequentially operating syustem that can provide many different guidance functions in a very flexible building block configuration. In addition this flexibility is enhanced by providing auxiliary functions for unspecified future growth potential. Precision guidance data is provided by accurate measurements of the times when the scanning beam passes over the aircraft. In addition airborne amplitude measurements are also being made to determine the intensities of sequentially radiated fixed beams that may be utilized at some MLS installations to prevent false courses (OCI beams) and to aid in the acquisition of the precision guidance beams (clearance beams).

THE INVENTION

This invention provides a landing system having integrated therein an independent monitoring capability in which signals from two differently functioning landing systems are integrated into a single system to provide both landing guidance and guidance monitoring. This is a preferred embodiment of the system in which the results of each of the differently functioning landing guidance systems are independently arrived at in the aircraft, compared in the aircraft, and the landing either completed or aborted depending on whether or not the two results are in acceptable agreement. The two systems respectively comprise: First, a well known MLS time sequence which is a part of the standard MLS system and during which landing guidance beams are scanned and the airborne receiver determines the position of the aircraft based on the times when the scanning beams pass over the aircraft; Second, a separate and differently operating system in which paired fixed landing guidance beams are radiated toward the aircraft at predetermined MLS times and the aircraft receiver compared the relative intensities of the paired signals for position determining purposes. The latter amplitude-based system, for azimuth guidance, uses paired fixed guidance beams sequentially radiated at different available MLS times, and directed respectively to the left and right of the centerline, and overlapped at the centerline in such a manner that an aircraft approaching along the centerline will intercept equal signal intensities to indicate on-course approach. Conversely, when the aircraft is off-course to one side of the centerline, it will intercept a stronger signal intensity at the time of transmission of the fixed beam which is directed to that side of the centerline, and a weaker signal intensity at the time of transmission of the fixed beam which is directed to the other side of the centerline. As a result, an off-course condition is indicated by unbalance of the intensities of the two fixed guidance beam overlapping signals, the side to which the aircraft is off-course being identified by strengthening of the signal radiated by that beam and weakening of the opposite fixed guidance beam signal. The times in which these fixed beams are radiated will be MLS available times which are not necessarily assigned for any other purpose, and the signals radiated therein will be used for providing independent confirmation of the final straight-line path to touchdown and will be independent of the main scanned precision guidance signals of the MLS.

Although the above discussion has focused on the azimuth guidance aspect, similar overlapping guidance beams can provide for operation in the elevation mode to provide independent landing guidance for elevation monitoring purposes.

The present invention can also provide fixed beam landing guidance which will be operative in the event of failure of the main MLS scanning system, or alternatively, which can provide a simplified MLS fixed beam landing system that is suitable for use at small civil airfields that cannot afford MLS scanning beam guidance for reasons of cost, or for use at certain tactical landing areas that cannot employ MLS scanning beam guidance because of the size and weight of required scanning beam antennas.

Both the MLS scanning beam landing guidance generation, and the fixed beam landing guidance generation furnishing the monitoring capability, can be performed by receivers of the MLS scanning beam type since such receivers are already designed to perform both timing and amplitude measurements. In addition the data processing required for ILM monitoring is well within the capability of modern microprocessors already designed for MLS system use, i.e. the required additional ILM data processing beyond that required for conventional MLS purposes alone does not raise any serious problems in the airborne receiver design.

OBJECTS AND ADVANTAGES OF THE INVENTION

It is the principal object of the invention to provide an independent fixed guidance beam system for confirming the accuracy of the landing data provided by the MLS landing system which is not approved for worldwide installation, and more particularly to provide a guidance system that will use the same format and repeating time sequence that the MLS uses and that will be compatible and functional with airborne MLS receiving equipment.

Another major object of the invention is to provide an independent monitoring system that can be implemented either by using independently radiated overlapping fixed beams from the ground, or alternatively by using either the MLS sector clearance signal beams or the OCI beams which would be slightly modified and reoriented to make them overlap appropriately at the centerline of the approach path.

It is a further major object of the invention to provide a system of the type specified which lends itself to the convenient configuration of a scaled-down fixed beam guidance system which is compatible with airborne MLS equipment for use at minor airports not equipped with MLS, and which will provide guidance accuracy that approaches the guidance accuracy of the main MLS system but at a small fraction of the cost thereof. The use of such a financially feasible scaled-down system is attractive because small airports do not require curved approaches to their runways since traffic is not heavy.

A further object of the invention is to permit the use of a simplified and reduced-size MLS ground station for military use, since the large ground station size required for MLS scanning beam systems is a major drawback in many tactical operations. The military, for example, have selected MLS for future use but to date, despite the expenditure of large sums of money, have not succeeded in obtaining an MLS ground station that is adequately small and light-weight for tactical use.

Other objects and advantages of the invention will become apparent during the following discussion of the drawings showing preferred embodiments of the invention.

DESCRIPTION OF PREFERRED EMBODIMENTS OF INVENTION

The typical MLS system is a sequentially operating system which radiates both guidance functions and data functions at different exclusively-occupied time intervals in a repeating sequence. The functions that can be radiated are, respectively:

| | |
|---|---|
| Basic Data Word 1 | Approach Azimuth Guidance |
| Basic Data Word 2 | High Rate Azimuth Guidance |
| Basic Data Word 3 | Approach Elevation Guidance |
| Basic Data Word 4 | Flare Elevation Guidance |
| Basic Data Word 5 | Back Azimuth Guidance |
| Basic Data Word 6 | Future-System Growth Guidance |
| Basic Data Word 7 | |
| Basic Data Word 8 | |
| Auxiliary Data | |

The number of guidance functions that are radiated by any particular MLS installation depends on the guidance services which must be provided at that ground location. There is also certain basic data that must be radiated from that installation. The above listed Auxiliary Data and Future-System Growth Guidance functions and their associated time intervals are reserved to accommodate future needs not yet specified.

Each of the above listed data or guidance functions has its own identification code within the preamble associated with that function, which code uniquely identifies the nature of the associated function to the airborne equipment. Since the individual functions are thus identified by their codes, it is not necessary that these functions be performed in any particular sequence. The aircraft receiver and processor include capability for recognizing the function being radiated to it using the preamble which precedes it, whereby the aircraft receiver is enabled to utilise the information appropriately.

Figure 1:
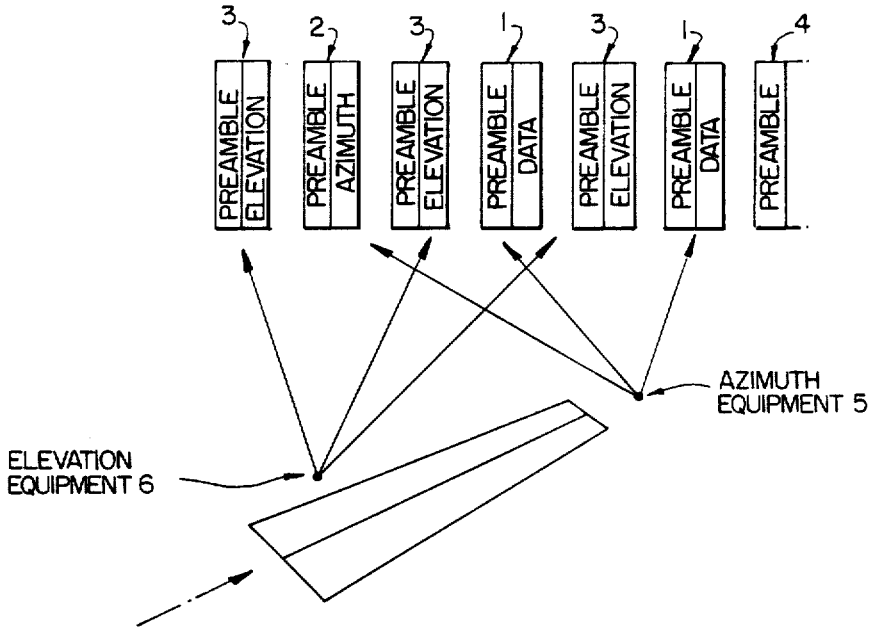
FIG. 1. (PRIOR ART)
FIG. 1 is a diagram showing a typical radiation sequence for the various functions of a known MLS system.
Figure 2:
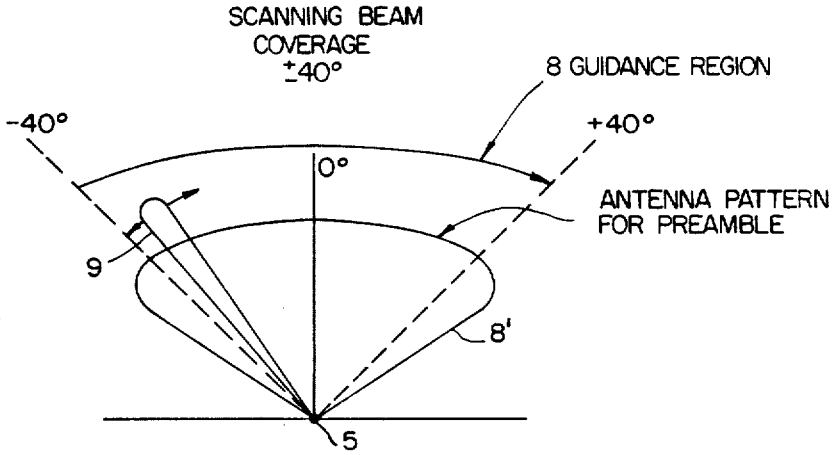
FIG. 2. (PRIOR ART)
FIG. 2 is a diagram showing typical radiation antenna patterns of a known MLS system.

Referring now to the drawings, FIG. 1 shows a function radiating sequence both for data and for azimuth and elevation guidance for a simplified MLS system. Appropriate basic data words are radiated as represented by data function blocks labeled 1 at times available between the times of radiation represented by other function blocks such as blocks 2 for azimuth and blocks 3 for elevation guidance functions, respectively, these functions all being radiated at repetition rates specified by the MLS ground equipment. A suitable preamble, such as the preamble 4, is shown in each function block at the start of the function being radiated, and the preambles for the various functions are radiated by the antennas at the guidance installations 5 and 6, the elevation installation 6 being located near the approach end of the runway and the azimuth installation 5 being located along the centerline at the far end of the runway. Specifically, the preamble for the azimuth guidance function 2 is radiated from an antenna with a pattern 8', FIG. 2, at the azimuth installation that provides coverage throughout the guidance coverage region 8 of $+-40°$ azimuth. The basic data words are generally radiated together with their preambles using this same angular coverage. If the preamble associated with a particular function indicates that it is an azimuth guidance function, then the TO and FRO scanning guidance signal associated with that preamble will be radiated by a narrow beam antenna with a pattern 9 which scans that same sector 8. The actual guidance data are obtained within the aircraft receiver by measuring times between successive passages of the scanning beam pattern 9 past the aircraft, as well known in the MLS art.

Figure 3:
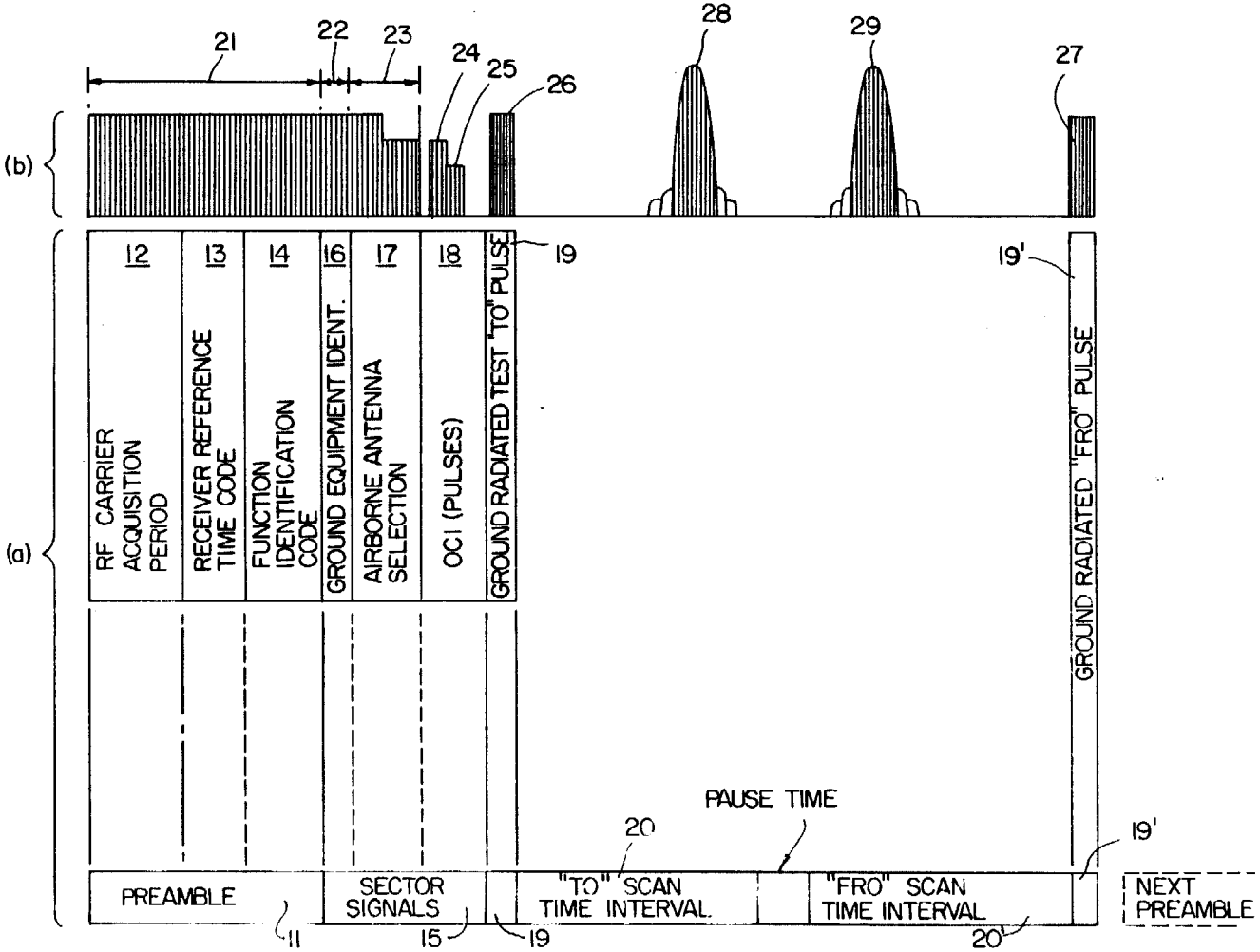
FIG. 3. (PRIOR ART)
FIG. 3 is a diagram showing the sequence of transmissions within an MLS guidance function, and showing the corresponding signals as received at the aircraft.

FIG. 3 in the vicinity of the bracket a shows in more detail the organization of the radiation during an azimuth scanning function of the MLS ground system including a preamble 11, sector signals 15, and TO and FRO scanning time intervals 20 and 20'. The preamble 11 is radiated first and includes a continuous wave 12 used for acquisition by the airborne receiver of the radio frequency carrier. This carrier is followed by a receiver reference time synchronization code 13. This is followed by a function identification code 14, in this case identifying the function as azimuth approach scanning guidance. These radiations constitute the preamble 11 of duration shown by the arrow 21.

The next radiated signals are the sector signals 15 which begin by transmitting a ground station identification code 16 which lasts for the period identified by the arrow 22. Following the identification code, there is radiated a constant level test signal 17 with duration as shown by arrow 23. This signal is used in the airborne equipment by switching airborne antennas during this interval 23 to determine which airborne antenna provides maximum signal and hence should be utilized thereafter. Subsequently, OCI signals 18 are radiated which are processed in the receiver to determine whether the aircraft is on a false course, i.e. following a scanning beam side lobe as indicated by a received OCI signal being stronger than the false scanning beam signal. Next, a TO scan test pulse 19 is radiated followed by a TO scanning beam, and then a FRO scanning beam followed by a FRO scan test pulse 19' is radiated, the test pulses being radiated immediately preceeding and following the times allocated to the TO scanning beam time 20 and the FRO scanning beam time 20'.

As can be seen across the top of FIG. 3 in the vicinity of the bracket b, the receiver in the aircraft develops appropriate signals based on the ground-radiations as just discussed. Specifically, as shown in FIG. 3 for the azimuth scanning function, the preamble transmission produce in the receiver a preamble sequence 21, followed by the ground station identification code 22, followed by the airborne antenna selection radiation 23. There are shown two OCI radiations 24 and 25 (out of six OCI radiations that could be transmitted), followed by the ground radiated TO scan test pulse 26. The TO and FRO scanning guidance beams 28 and 29, respectively, are then received in the aircraft at times depending on the location of the aircraft with respect to the centerline of the runway, and finally the FRO scan test pulse 27 is radiated. The clearance pulses are not shown in FIG. 3 because they would not be used in the FIG. 2 configuration because the scanning beam scans the full $+-40°$ region, not a sector of reduced width.

In order to implement the present invention so as to provide both scanned beam guidance and fixed beam precision guidance integrated therewith in a common system, the fixed beam precision guidance signals must be incorporated into the just-described MLS system in a compatible manner, so that a monitoring capability can be provided by comparing in the airborne equipment the scanning beam guidance results and the fixed beam guidance results.

It is an important object of the invention to integrate the fixed beam guidance system into the MLS in such a way that future MLS ground installations which are modified to implement this invention by incorporating fixed beam precision guidance capability will not provide incorrect data to earlier model MLS airborne systems which are not so modified. Even though achieving this objective is desirable, it is not absolutely necessary because the added capability in later built equipment could be restricted, at least for a time, to special applications which would not be utilized with the older MLS airborne equipment. For instance, the modified ground systems could initially be restricted to certain tactical ground installations for the battle environment, the use of which would be restricted to aircraft equipped with updated tactical MLS type receivers that would be configured in accordance with this disclosure.

For the purpose of illustrating the present inventive concepts which integrate fixed beam precision guidance into an MLS-type scanning beam system, three different embodiments will be discussed. The first of these embodiments is shown and described with reference to FIGS. 4 and 5 and involves the radiation of overlapping fixed beams in both azimuth and elevation from additionally installed antennas which function within various time intervals provided in the MLS sequence to accommodate future growth of the system. The second embodiment shows the modification of currently radiated MLS system beams to provide fixed beam precision guidance, the modifications being of existing MLS OCI beams as shown in FIG. 6, or being of existing left and right clearance beams as shown in FIG. 7. The third embodiment shows the radiation from additionally installed antennas of my fixed beam precision guidance signals during unused portions of intervals already assigned for other MLS functions, for example as shown in FIG. 9 during the TO and FRO scanning intervals of the MLS system.

Figure 4A:
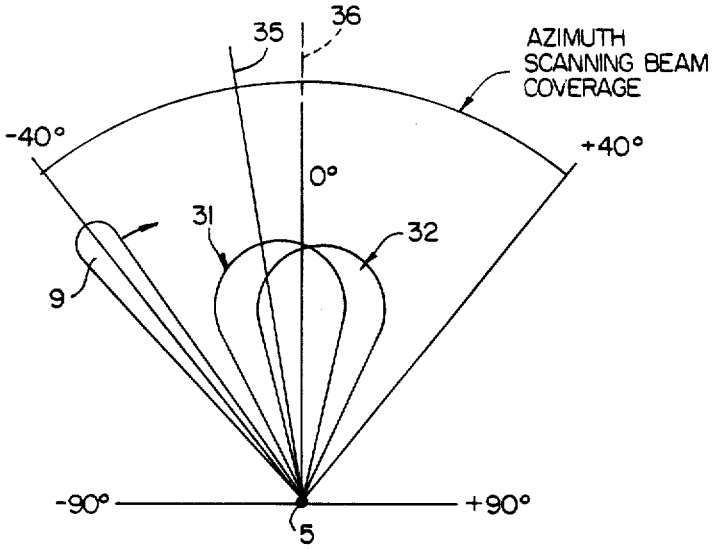
FIGS. 4A and 4B respectively show a first embodiment including azimuth and elevation antenna radiation patterns for a fixed beam precision guidance system.
Figure 4B:
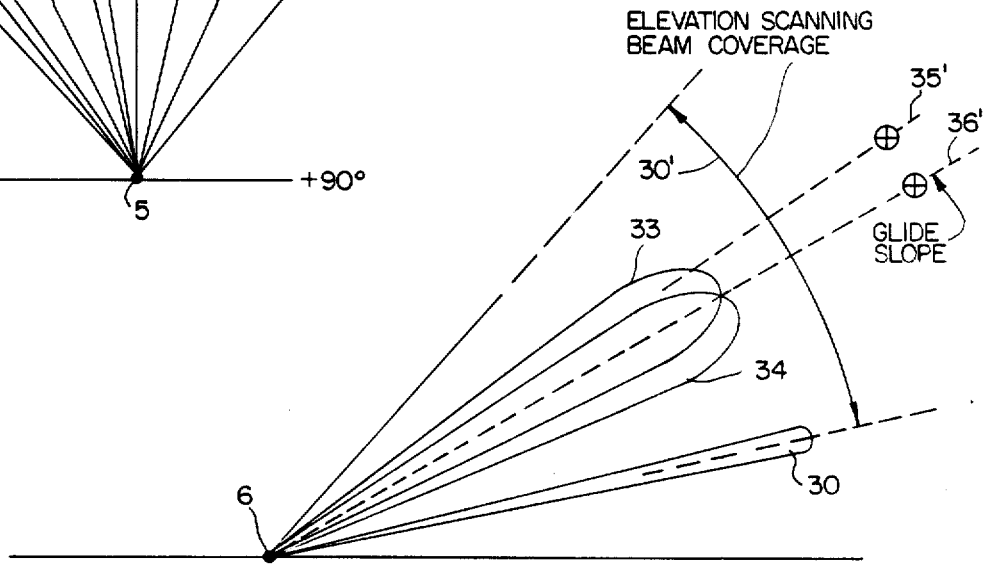
Figure 5:
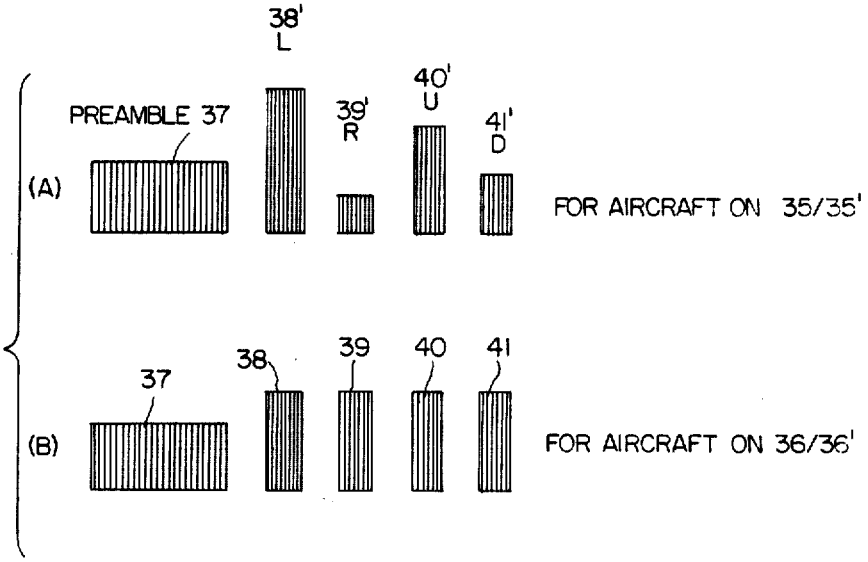
FIGS. 5A and 5B show the relative amplitudes of signals as received at an aircraft which were radiated from the fixed beam precision guidance patterns of FIG. 4.

Considering now the first embodiment shown and described with reference to FIGS. 4 and 5, this embodiment uses the spare future guidance function, which is designed to accommodate future growth guidance needs, and radiates in its associated time interval my fixed beam guidance signals. This embodiment uses the spare auxiliary data function to radiate data appropriate to accompany the fixed beam precision guidance signals. This embodiment also employs paired separate antennas additionally installed at the MLS ground location for radiating paired fixed precision guidance beams along the approach path to provide landing guidance which is independent of the guidance provided by the MLS TO and FRO scanning beam identified by the reference numeral 9 in FIGS. 2 and 4A. These added fixed precision guidance beams are properly identified by their own preamble which defines their function to the airborne receiver and by auxiliary data transmitted therewith to enable proper processing of the signals received at the aircraft from the fixed guidance beams. In this embodiment the fixed beam precision guidance function is provided by added antennas 80 and 81, FIG. 10A, driven by the ground equipment sequentially to radiate a left pattern 31 and a right pattern 32 with respect to the desired landing azimuth centerline course 36. FIG. 4B shows the radiation of an elevational upper pattern 33 and lower pattern 34 with respect to a desired glideslope using antennas 89 and 90, FIG. 10B. Note that the azimuth beams 31 and 32 partially overlap along the centerline 36 in FIG. 4A, and that the fixed guidance beams 33 and 34 for elevation partially overlap along the desired glideslope 36' selected for monitoring in FIG. 4B. The beam 30 shown in the latter figure comprises the UP and DOWN MLS scanning beam covering the vertical arc 30'.

The fixed beam guidance function signals as received in the aircraft are shown in FIGS. 5A and 5B and include in each case a preamble 37 containing information, including function identification, etc., followed by paired fixed beam guidance signals respectively representing azimuth and elevation information for two different locations (35,35' and 36,36') of an approaching aircraft. The fixed beams 31, 32, 33 and 34 in FIG. 4 are all transmitted with equal intensity along the approach path. Since the paired beams respectively overlap equally along the selected glideslope 36' and centerline 36, an aircraft which is precisely located therealong will receive equal intensities of paired signals from all four of these beams. Thus FIG. 5B shows the resulting signals 38, 39, 40 and 41 in the aircraft receiver to be of equal amplitudes. However, if the aircraft strays from the desired path, the signal from the beam which is directed more toward the side to which the aircraft has strayed will be strengthened while the signal from the beam directed away from that side will be weakened. Thus FIG. 5A shows that for an aircraft position 35,35' left-of-center and above-glideslope, the left signal 38' is stronger than the associated right signal 39', and the upper signal 40' is stronger than the associated lower signal 44'. This unbalance in the signals 38',39' and 40'',41' is processed in the aircraft receiver to deliver an appropriate output signal whose amplitude indicates non-centered position of the aircraft to the left in azimuth and above the selected glideslope in elevation, because when the aircraft strays from the desired path, the signal strengthens on the side to which it has strayed, and weakens on the side from which it has moved away. Moreover, the degree to which straying off-course has occurred is proportionally indicated by the degree of unbalance of the amplitudes of the paired signals 38,39 and 40,41, to achieve proportional-guidance.

These output signals may be used either to provide auxiliary monitoring signals which in the MLS system are used for comparison with similar outputs based on MLS scanning beam guidance signals, or alternatively the fixed beam guidance can replace the MLS scanning beam signals entirely for small airport installations in order to provide at such airports less complex and expensive landing capability which is still compatible with the receiver systems in aircraft having full MLS capability. Radiation of this fixed beam precision guidance and associated data utilizes only a very small percentage of the auxiliary time allocated in the MLS system to accommodate as yet undefined future growth of the system. Since only a minor amount of this auxiliary time allotment is needed for the fixed beam guidance function, time available for future growth is scarcely diminished.

At present it is normal practice to radiate the preamble with its reference time code for a guidance function by using the same equipment that radiates the guidance beams themselves, as distinguished from radiating the preamble and the associated guidance functions using separately located ground equipments. Thus for systems wherein the azimuth and elevation functions are co-located the transmission means for the preamble data functions can be especially economically installed. However nothing precludes the use of this embodiment in an installation such as is shown in FIG. 1 wherein the azimuth and elevation radiating equipments are located widely spaced along the runway.

Figure 6A:
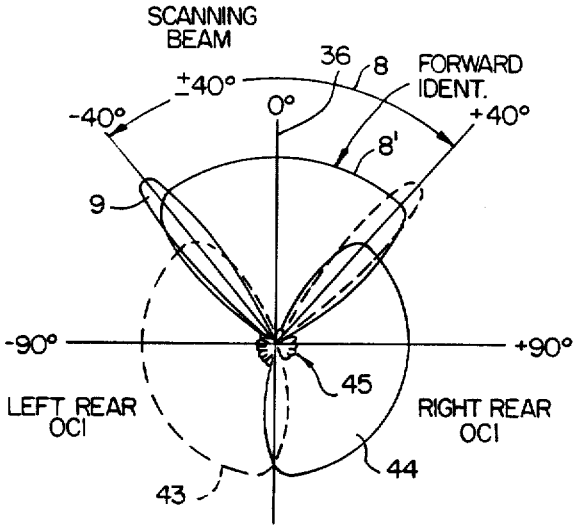
FIG. 6A. (PRIOR ART)
FIGS. 6A and 6B show azimuth antenna radiation patterns respectively from a conventional MLS system, and from a modified MLS system wherein the OCI patterns have been altered to provide a second embodiment of the invention wherein both MLS scanned beam and fixed beam precision guidance are provided at the same ground location.
Figure 6B:
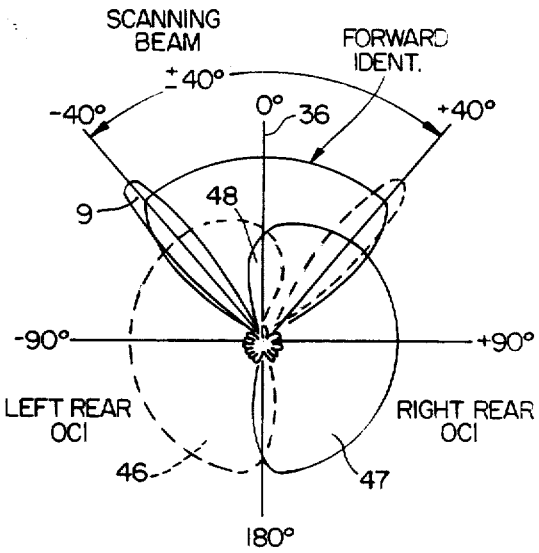

Consideration will now be given to the second embodiment concept which uses a somewhat different approach to the fixed-beam precision guidance concept. The different approach is illustrated by two different forms shown respectively in FIGS. 6 and 7. The second embodiment differs from the concept discussed in connection with FIGS. 4 and 5 in that, instead of providing additional antenna means for performing the fixed beam precision guidance functions as related above, the second embodiment alters the radiation patterns of existing MLS antennas to overlap their beams along the centerline and thereby achieve the desired fixed beam precision guidance, without diminishing the normal functions of those already-existing antennas. FIG. 6A shows unmodified radiation patterns including left and right OCI beams, while FIG. 6B provides a first form of the embodiment which uses these OCI (Out of Course Indication) antenna beams of the MLS system by overlapping the beams at the centerline 36. FIG. 7 provides a second form of the embodiment which uses the right and left Clearance antenna beams of the MLS system, described hereinafter.

In the first form, FIG. 6A shows standard MLS OCI beams 43 and 44 used to suppress the possibility of false course approaches by an aircraft which might be following a side lobe 45 of a scanning beam antenna instead of the main beam 9. When the aircraft is outside the $+-40°$ scanning sector, it is considered to be outside of the guidance region 8. These OCI beams 43 and 44 are radiated at such intensities that for an aircraft located outside the guideance beam region 8 their received amplitudes must be greater than the signals from any scanning beam lobe or clearance beam guidance lobe received, but for an aircraft located within the region 8 the OCI signal intensity must be at least 5 db less than the guidance signals. After an airborne receiver has sequentially received signals respectively identified by their times of occurence within the guidance function as being OCI signals, and in addition has received clearance signals (from installations employing them) and scanning beam signals, then if the clearance or scanning beam guidance signals are not greater by at least 5 db in intensity than the OCI signals, the airborne signal processor warns the pilot that he is out of the guidance coverage region 8. Of course, the OCI signals are of greater intensity than the scanning beam signals 9 or clearance signals (if radiated) at all locations outside the azimuth coverage of the guidance region 8. Up to six azimuth and two elevation OCI beams are provided for in various MLS systems. Nothing in the MLS OCI specification criteria, therefore, precludes OCI beams from being used to provide the present fixed beam precision guidance during the assigned OCI radiation times.

As shown in FIG. 6B, the OCI beams have been modified to provide the overlapping contour shown as beams 46 and 47 which overlap the azimuth centerline 36 at 48. When thus configured, the beams 46 and 47 can still perform their normal OCI functions, while at the same time the portions of the beams overlapping the centerline at 48 can give the same kind of fixed beam precision guidance functions as was discussed above with respect to FIGS. 4 and 5. Such dual function OCI and fixed beam guidance radiations would not be incorrectly interpreted by present day unmodified MLS receivers since their fixed beam guidance capabilities would simply be disregarded thereby, while at the same time the receivers would properly utilize the OCI information. On the other hand, future MLS receivers which are appropriately programmed by radiated data words to take advantage of the dual OCI beam capabilities, would also obtain fixed beam precision guidance from these OCI beams.

It is recognised that in some airport locations having severe lateral multipath problems it may be difficult to utilize the wide coverage fixed OCI beams 46 and 47 shown in FIG. 6B to provide precision fixed beam guidance having adequate definition and freedom from lateral multipath effects by overlapping the beams along the centerline 36. Nothing in the MLS specified criteria for generation of OCI beams, however, precludes the radiation during unused OCI time intervals of narrow precision fixed guidance beams 31, 32, 33 and 34 as shown in FIGS. 4A and 4B. Such beams would be ignored by presently existing MLS receivers, but would be properly utilized by future MLS receivers having the proper programming enabled by auxiliary data words, for example, to process their precision fixed beam guidance data.

Figure 7A:
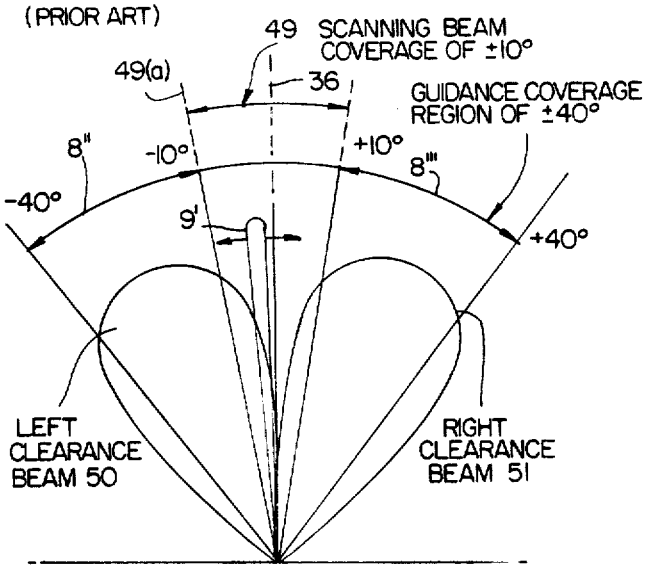
FIG. 7A. (PRIOR ART)
FIGS. 7A and 7B show azimuth antenna radiation patterns respectively from a conventional MLS system and from a modified MLS system wherein the left and right clearance patterns have been altered to provide an alternative form of the second embodiment of the invention wherein both MLS scanned beam and fixed beam precision guidance are provided at the same ground location.
Figure 7B:
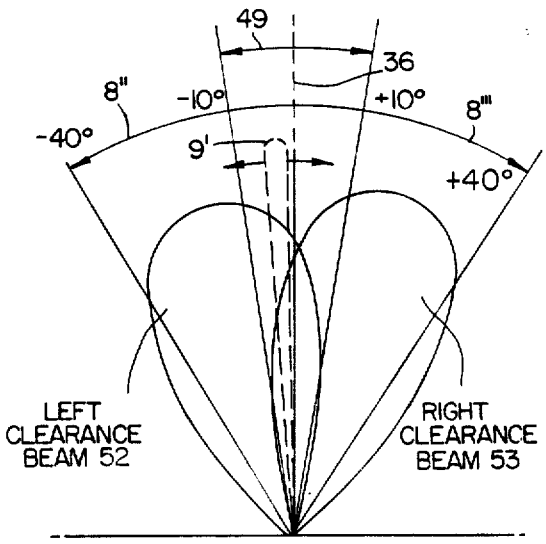

As an alternative form of this second embodiment of the invention which in either form alters existing MLS radiated beams and uses them for fixed beam precision guidance, FIG. 7 serves to illustrate the concept of modifying the standard MLS azimuth clearance beams 50 and 51 shown in FIG. 7A, by extending them to overlap along the centerline 36 of the approach path to assume the beam shapes shown at 52 and 53 of FIG. 7B. As discussed with reference to FIG. 2, in the usual MLS system the scanning beam 9 provides coverage over the whole guidance region 8 which extends $+-40°$ of the centerline 36. However, in the scanning beam embodiment depicted in FIG. 7, the scanning beam 9' only provides precision scanning beam proportional-guidance over a sector 49 extending $+-10°$ each side of the centerline 36, such restricted angular coverage being appropriately noted in the radiated basic data words and being an existing standard alternative form in the MLS system. The left and right sector arcs 8'' and 8''' which are located just outside the scanned region 49, and which extend to the MLS specified limits of $+-40°$, are according to present MLS specification covered by MLS clearance beams 50 and 51 as shown in FIG. 7A. Measurements of the signal intensities of the clearance beam signals are used in the aircraft to provide appropriate fly/left or fly/right indications to the pilot to guide him to intercept the main scanned guidance beam 9' in the sector 49. The criteria set forth in the MLS specifications for the clearance beams are: that the signal intensity of clearance beam 50 for an aircraft located in sector arc 8'' must exceed the signal intensity of clearance beam 51 by 15 db, and must exceed the side lobes of the scanning beam signal 9' by 5 db; and in addition, that the signal intensity of clearance beam 50 must be 5 db below the scanning beam signal intensity for an aircraft located at $-10°$ along line 49a, i.e. at the negative edge of the scanning beam coverage region 49. Similar specifications apply to clearance beam 51 in sector 8'''. It is therefore apparent that nothing in the MLS pecification regarding the clearance beams prevents these clearance beams from being overlapped along the centerline 36 as shown at 52 and 53 in FIG. 7B for the purpose of providing fixed beam precision guidance for aircraft located within the $+-10°$ guidance region 49.

Figure 8:
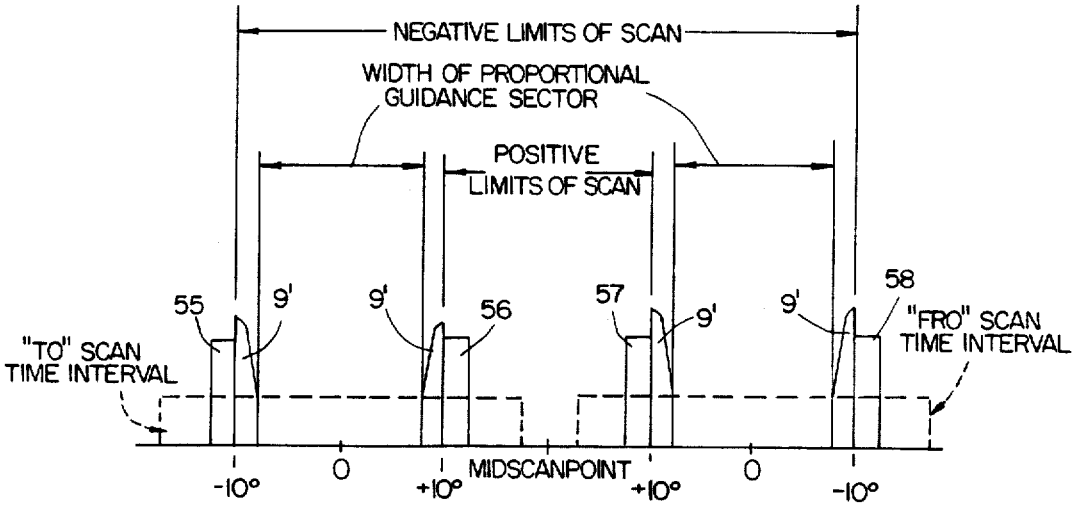
FIG. 8. (PRIOR ART)
FIG. 8 is a diagram showing for a typical MLS system the angular positions at which clearance beam signals are transmitted relative to the beginning and end positions of the TO and FRO scanned MLS beams.

FIG. 8 shows the standard MLS format for the clearance beams relative to the $+-10°$ scanning beam 9' which in the figure are shown four times adjacent to the four outermost angular positions of the scanning beam 9'. The four clearance beam pulses 55, 56, 57 and 58 are radiated at times when the scanning beam 9' has reached its outermost TO and FRO scan limits. For an aircraft position which is to the left of the centerline 36, for instance as shown at 49a in FIG. 7A, the fly/right pulse intensities 56 and 57 as received at the aircraft would be the same as each other, but less (not illustrated) than the fly/left pulse intensities 55 and 58. For a centerline aircraft location 36, the intensities of all four pulses would be equal as shown in FIG. 8. It should be noted that in MLS systems where the scanning beams scans the full 40° each side of center, so that clearance beams are not employed, FIG. 4A, they can still be added to the system for fixed beam precision guidance purposes, and will be used for guidance monitoring purposes by updated and properly programmed MLS receivers, while being ignored by presently existing unmodified MLS receivers.

Clearance beams are not radiated with MLS elevation functions, and therefore the use of clearance beams for providing fixed beam precision guidance is only suitable for azimuth-guidance MLS monitoring or independent azimuth guidance. Hence the use of clearance beams is not generally as useful a form of the present invention as is the use of OCI beams.

Considering now the third embodiment of the present invention as described with reference to FIG. 9, this embodiment radiates from newly added fixed beam precision guidance antennas during unused time intervals within the guidance function signal format, as distinguished from using auxiliary guidance function time intervals as provided in the MLS system to accommodate future growth of the system as exemplified by the first embodiment, or from using presently existing radiated beams within already existing guidance functions which are also used for other purposes such as OCI or clearance beams.

This third embodiment employs, for instance, additional fixed beam precision guidance antennas oriented according to FIG. 4, but which radiate their fixed guidance beams at unused suitable times during the over-all interval of time allocated for the scanning beam function. The use of these times is somewhat along the lines suggested in the Enein U.S. Pat. No. 4,306,239. Such unused suitable times would be outside the times of actual beam scanning and/or clearance beam radiation, since the interval of time allocated for the scanning beam is much longer than is required for normal scanning beam operation and/or clearance beam radiation. Normal scanning beam operation does not exceed $+-40°$, whereas sufficient time is included in the interval to permit up to $+-62°$ of scanning. The time allocated for the scanning operation between the $+-40°$ and the $+-62°$ is thus normally available for other uses, such as the radiation of fixed beam precision guidance pulses.

Figure 9A:
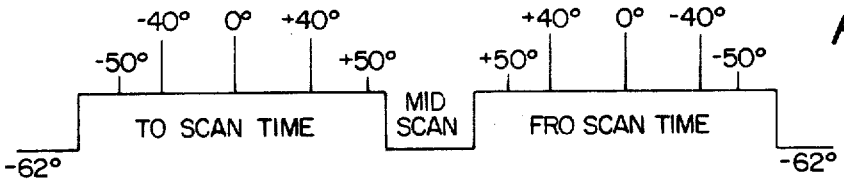
FIG. 9 is a diagram showing a third embodiment of this invention wherein fixed beam precision guidance signals are transmitted during the scanning intervals of the TO and FRO scanned MLS beams.
Figure 9B:
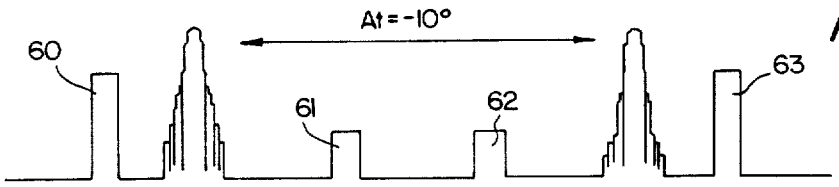
Figure 9C:
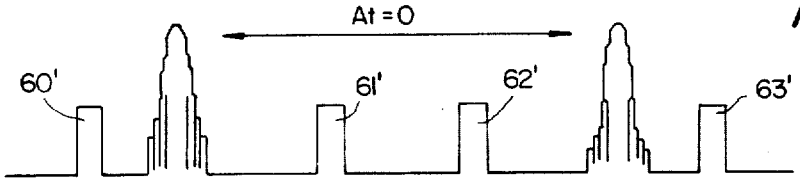

FIG. 9A shows the interval of time allocated to the scanning function within the MLS time sequence, and FIGS. 9B and 9C show corresponding signals received in the aircraft for azimuth guidance, assuming the radiation of azimuth fixed beam guidance pulses of the type discussed in connection with FIG. 4A. As illustrated in FIG. 9B, the left fixed guidance beam is radiated at a time corresponding with $-50°$ of the TO scan as shown at 60, and again at a time corresponding with $-50°$ of the FRO scan as shown at 63. Likewise, the right fixed guidance beam is radiated at a time corresponding with $+50°$ of the TO scan as shown at 61, and again at a time corresponding with $+50°$ of the FRO scan as shown at 62. The angular scale is shown in FIG. 9A. The relative intensity of the left fixed guidance beams 60 and 63 with respect to the intensities of the right fixed guidance beams 61 and 62 as shown in FIG. 9B, when compared in the processor of the MLS receiver, serve to indicate that the aircraft is off the centerline 36 to the left. The differences of these intensities indicate how far off the centerline the aircraft is located. Equal amplitudes of the intensities, i.e. of all four pulses 60', 61', 62' and 63' as shown in FIG. 9C indicate that the aircraft is exactly on the centerline 36. Similar relative intensities would indicate position of the aircraft in elevation during a subsequent elevation scanning function. Auxiliary data words radiated in association with the fixed beam guidance pulses inform the aircraft receiver of the portion of its program which should be used to process the signals received in the aircraft from that that ground location. Furthermore, the signals radiated according to this third embodiment are radiated at times different from the times normlly used for radiating clearance beam signals, or test pulses, or scanning beam signals, so that presently existing MLS receivers will not erroneously interpret these fixed beam precision guidance signals. Ample time is allocated in the MLS scanning beam scanning time interval for this purpose.

Accordingly, it can be seen that there are many different practical embodiments, including those herein described as well as others not described, that can be used to radiate fixed beam precision guidance pulses for both azimuth and elevation guidance within the framework of the specified MLS format, which format is very flexible and has vast unused and/or unassigned time periods leaving ample time in which to radiate the fixed beam guidance signals as well as auxiliary data words to appropriately programmed MLS receivers, while avoiding erroneous responses by presently existing unmodified receivers.

It may also be true that some presently existing unmodified MLS receivers do not have the precision needed for utilizing the present fixed beam guidance signals to generate precision landing guidance. The problem is that they may lack adequate capability for accurately measuring the relative amplitude intensities of the fixed beam guidance signals with such precision as would be required to match the accuracy of the scanning beam guidance, in view of the fact that existing receiver amplitude measuring capability may be only sufficient to provide false course suppression based upon signal strengths received from MLS OCI beams, or to provide fly/left, fly/right guidance based upon measurements of signal strengths from clearance beams. In addition, signal processing software required for use in the receiver in conjunction with the fixed beam guidance function is not currently programmed into present models of MLS receivers. However, proper modification of current receivers to use the present fixed beam guidance features is easily accomplished, including improvement of their capability for signal intensity measuring and comparing, and improvements to add the appropriate software. New receiver models can readily incorporate the needed precision amplitude measuring capability and the appropriate software.

Figure 10A:
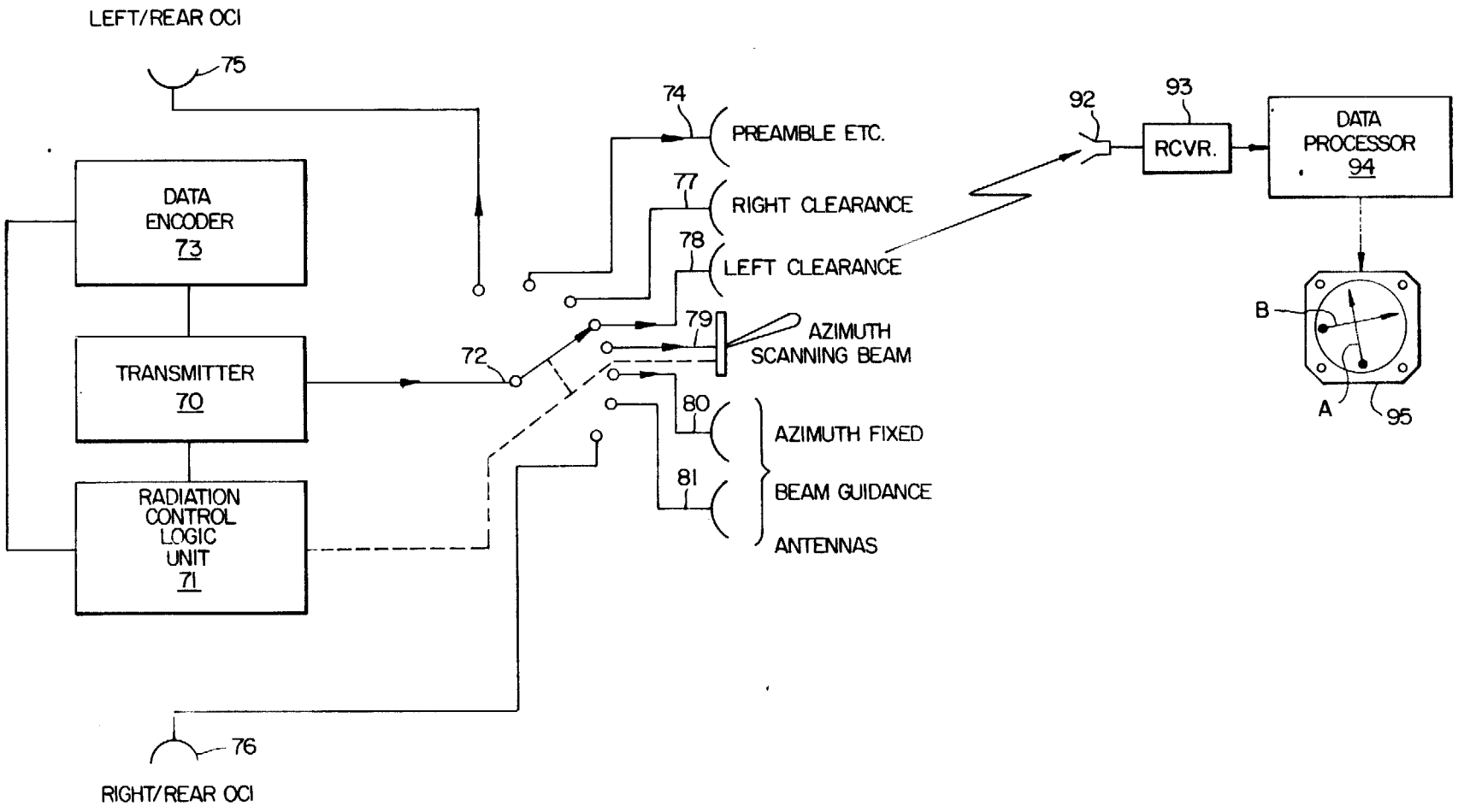
FIGS. 10A and 10B are block diagrams respectively showing, for azimuth and elevation, embodiments of ground and airborne MLS equipment modified to implement the present invention which combines both MLS scanning beam guidance and fixed beam precision guidance at the same integrated ground location.
Figure 10B:
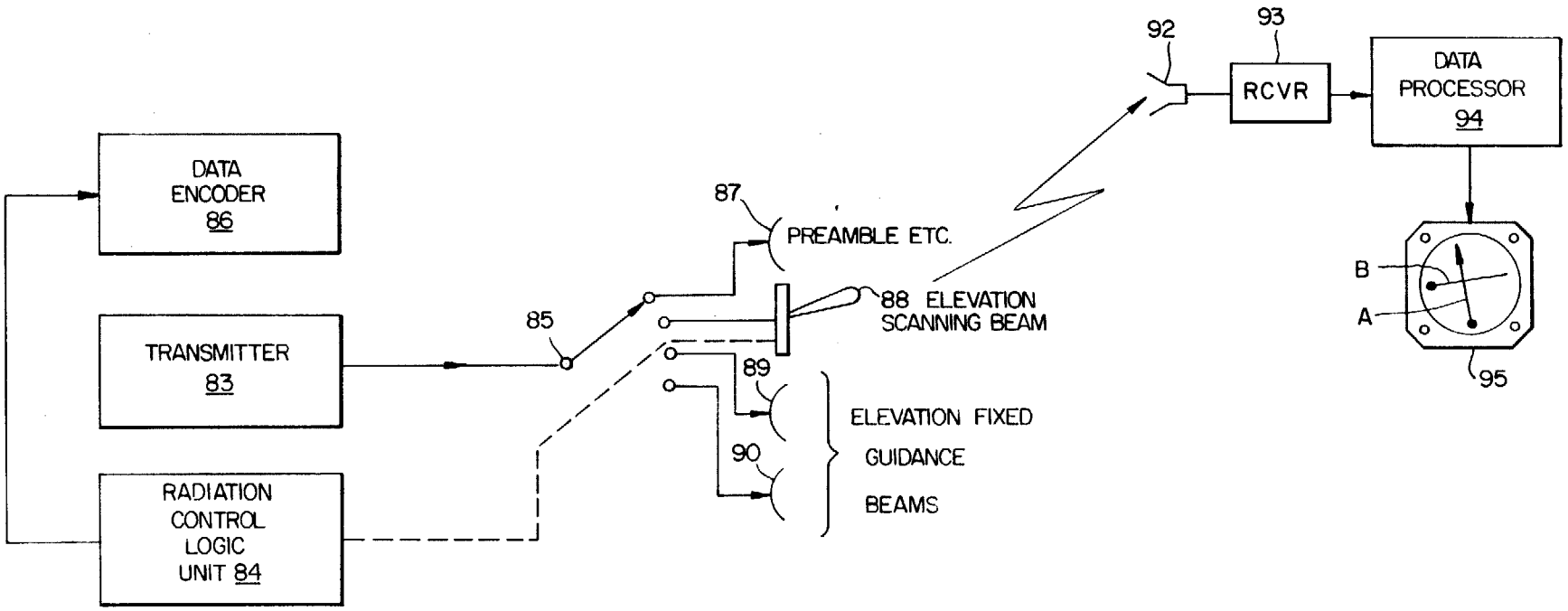

FIGS. 10A and 10B show integrated systems operative to provide both scanning beam and fixed beam guidance according to this invention, FIG. 10A showing an azimuth portion of the system and FIG. 10B showing an elevation portion of the system. The specific detailed embodiment described herein is for a conventional split-site MLS system similar to that of FIG. 1 but having fixed beam precision guidance integrated thereinto using OCI allocated time intervals, and providing either monitoring of the scanning beam guidance function or alternatively providing for independent fixed beam landing guidance for use at small airports. In both FIGS. 10A and 10B an airborne receiver and data processing means is illustrated which is in fact the same airborne unit although it is repeated in both diagrams. The azimuth ground equipment shown in FIG. 10A includes a transmitter 70 which selectively feeds, via a suitable switch unit 72, multiple antennas 74 through 81 which respectively have different radiation pattern shapes depending on the function that each is desired to perform. Although switch 72 is shown schematically as a rotary switch, it would comprise an electronic switching unit in a practical installation. The position of the switch 72, and its dwell time at each selectable position, is controlled by a programmed radiation control logic unit (RCLU) 71. The control unit 71 also controls whether the transmitter 70, when connected to a particular antenna, transmits a continuous wave output or whether it transmits a data encoded function, for example, the reference time code or appropriate data words. Such encoding is provided by the data encoder 73 when called for by the RCLU 71.

The elevation equipment shown in FIG. 10B similarly includes a transmitter 83 which selectively feeds, via a suitable switch unit 85, multiple antennas 87 through 90 which respectively have different radiation pattern shapes depending on the function that each is desired to perform. The position of the switch 85, and its dwell time on each selectable position, is controlled by a programmed radiation control logic unit (RCLU) 84 which also controls whether the transmitter 83, when connected to a particular antenna, transmits a continuous wave function or whether it transmits a data encoded function. Such encoding is provided by the data encoder 86 when called for by the RCLU 84.

The beams radiated by the various antennas provide signals received in the air by airborne equipment (repeated in FIGS. 10A and 10B) which includes an antenna 92 coupled to an airborne receiver 93. The output signals from the receiver are delivered to an airborne data processor 94 which performs all the programmed functions necessary to provide guidance, and which delivers guidance signals to drive landing guidance means which in this embodiment comprise a crossed needle landing indicator 95 which is of standard form.

The systems shown in FIGS. 10A and 10B provide the standard functions comprising the currently accepted MLS system, but in addition can be utilized as set forth hereinafter to provide either scanning beam guidance compatibly combined with my novel fixed beam guidance monitoring system, or alternatively to provide guidance using only my fixed beam guidance system, i.e. at airports which are small and have low traffic levels and therefore do not require the more sophisticated curved approach paths that the scanning beams of the full MLS system can provide.

As discussed previously, MLS is a very flexible system that can be installed in a wide variety of configurations, depending on the terrain at a particular site and the traffic volume, etc. The particular detailed MLS embodiment discussed below with reference to FIGS. 11A and 11B was chosen as representative of a typical installation and also as an illustration of previous discussions within this disclosure. The azimuth portion of the MLS system shown in FIG. 10A is configured to provide scanning beam coverage using the beam 9' shown in FIG. 11A to provide a precision guidance region 49 of $+-10°$. Beams 50 and 51 provide clearance sector beams outside this $+-10°$ region and extending guidance to the limits of $+-40°$, defined by the sector 8. OCI beams 43 and 44 provide false course suppression outside the guidance limits of $+-40°$. Beams 31 and 32 provide the fixed beam precision guidance of my invention.

Figure 11A:
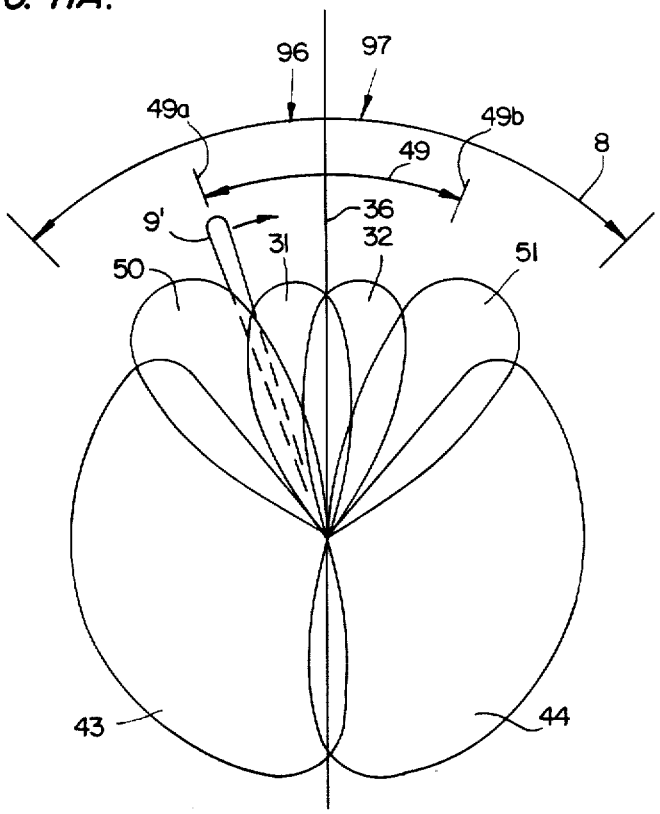
FIGS. 11A and 11B are respectively ground-station azimuth and elevation radiation patterns for a system as shown in FIGS. 10A and 10B.
Figure 11B:
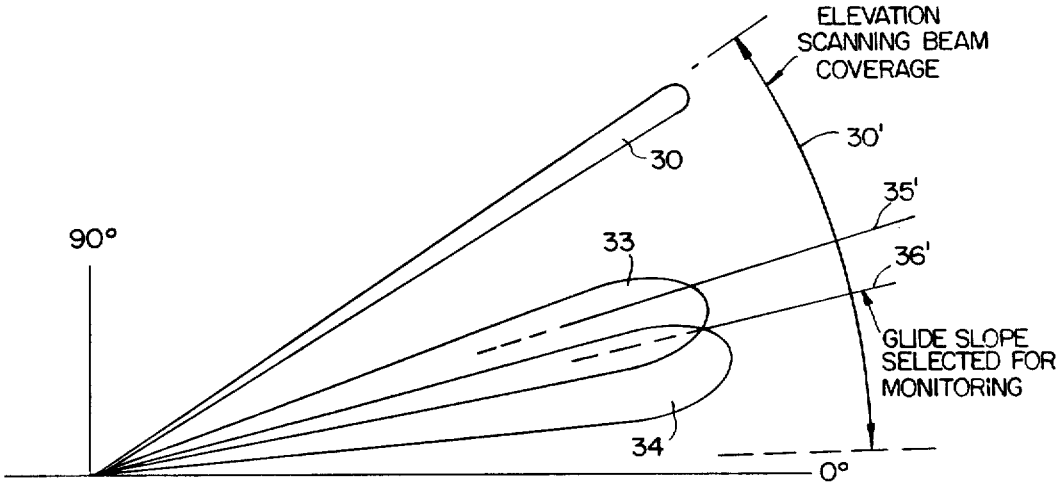

The elevation portion of the MLS system is illustrated by FIG. 10B and FIG. 11B, and is configured to provide scanning beam coverage using beam 30 scanning the vertical arc 30', while the beams 33 and 34 provide the fixed beam precision guidance of the present invention.

A sequence of conventional MLS beam radiation from the ground antennas of FIG. 10 is normally as follows commending with the azimuth equipment. As shown in FIG. 10A, a preamble is first transmitted from antenna 74 with antenna pattern coverage corresponding to $+-40°$ toward an approaching aircraft in the forward guidance region 8 as shown in FIG. 11A. The preamble 11, FIG. 3, includes an identification of the MLS function 14 being radiated which operates in the receiver to call up the proper processor program to process the data being radiated within that same guidance function from the ground installation. Sector beams 15 are then radiated from the antenna 74, commencing with the ground installation identification code 16 (station identity) and the airborne antenna selection signal 17. Then the out-of-course OCI beams 18 are transmitted from the azimuth antennas 75 and 76 to provide the beams 43 and 44, FIG. 11A, to warn the pilot when he is outside the guidance region 8. The TO Test pulse 19 is then radiated via the antenna 74, followed by radiation of the left clearance beam 50 via antenna 78, which is then followed by the TO scanning beam 9' via the antenna 79, after which radiation of the right clearance beam 51 occurs via the antenna 77. After a pause, a second right clearance beam is radiated via the antenna 77, followed by the FRO scanning beam 9' using the antenna 79, which is then followed by radiation of a left clearance beam 50 by the antenna 78. Radiation of the FRO test pulse 19' via the antenna 74 terminates the MLS azimuth guidance function.

The azimuth function then gives way to the elevation function sequence. The elevation preamble is radiated from the antenna 87, FIG. 10B, with broad coverage, and the elevation scanning beam 30 of FIG. 11B is radiated from the antenna 88. After the elevation beam have been radiated, associated basic data words are radiated, followed by another elevation function. Then the system reverts to radiation of a next azimuth fuction in the sequence. The airborne receiver and data processor perform in accordance with conventional MLS practice.

The technique for including the radiation of my fixed beam precision guidance functions in the FIG. 10 MLS system is as follows: First considering azimuth guidance, FIG. 10A, there are six OCI time intervals available for radiation of OCI beams in the present MLS specification. It is conventional to radiate only two OCI beams 43 and 44, FIG. 11A, in just two of these six intervals, leaving four unused OCI intervals available. The present fixed beam precision guidance beams can therefore be radiated during unused OCI intervals by programming the logic control unit 71 to transmit sequentially via the switch 72 and antennas 80 and 81 my fixed beam precision beams having beam patterns 31 and 32 which overlap along the centerline 36 as shown in FIG. 11A. In addition the logic control unit 71 initiates the transmission of auxiliary data words using the auxiliary data function and the antenna 74 and switch 75, at appropriate times in the overall MLS radiating sequence, which data words identify the nature of the fixed beam precision function.

Referring now to the elevation equipment, FIG. 10B, in a similar manner the logic control unit 84 is programmed to energize the transmitter 83 during two elevation OCI time intervals and to connect it via the switch 85 to the antennas 89 and 90 to radiate fixed beam precision guidance beams with patterns 33 and 34 which overlap the desired glideslope 36' selected for monitoring, FIG. 11B. Presently existing MLS receivers, not configured in accordance with this invention, would ignore these fixed beam precision guidance beams 33 and 34, which are radiated during OCI time intervals, as previously discussed. Conversely, an MLS receiver programmed in accordance with this invention would receive auxiliary data words and appropriately use them to process fixed beam precision guidance beams to generate appropriate guidance indications.

Figure 12:
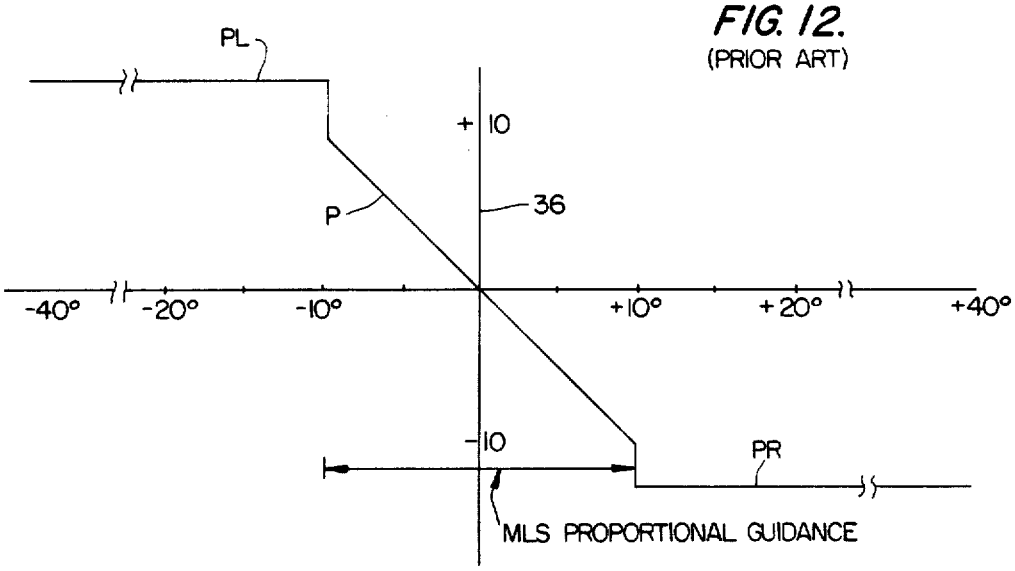
FIG. 12. (PRIOR ART)
FIGS. 12 and 13 respectively are diagrams illustrating the outputs of an airborne receiver in response respectively to guidance signals received thereat from conventional MLS scanning beam guidance ground equipment, and from a system employing fixed beam precision guidance signals radiated from the ground.

FIG. 12 shows the output response by an MLS receiver and processor to azimuth MLS scanning beam guidance beam received in response to scanning beam 9' as shown in FIG. 11A. The illustrated airborne response to the MLS scanned proportional guidance system includes a curve P of the processor output voltage for various different angular locations of the aircraft on both sides of the 0° centerline 36, plotted horizontally. For an aircraft position at 0°, on the centerline, the output will be zero, meaning that the azimuth needle A of the indicator 95, FIG. 10, will be centered. As displacement of the aircraft off the centerline increases, the output on curve P will linearly increase needle movement for displacements up to 10° on each side of center, although the over-all curve is shown for deviations up to 40° each side of the centerline. The response of the FIG. 12 curve beyond the linear portion P, which is the limit of scanning beam proportional coverage, is controlled by the clearance beams 50 and 51 to provide constant amplitude fly/left and fly/right signals PL and PR.

Figure 13:
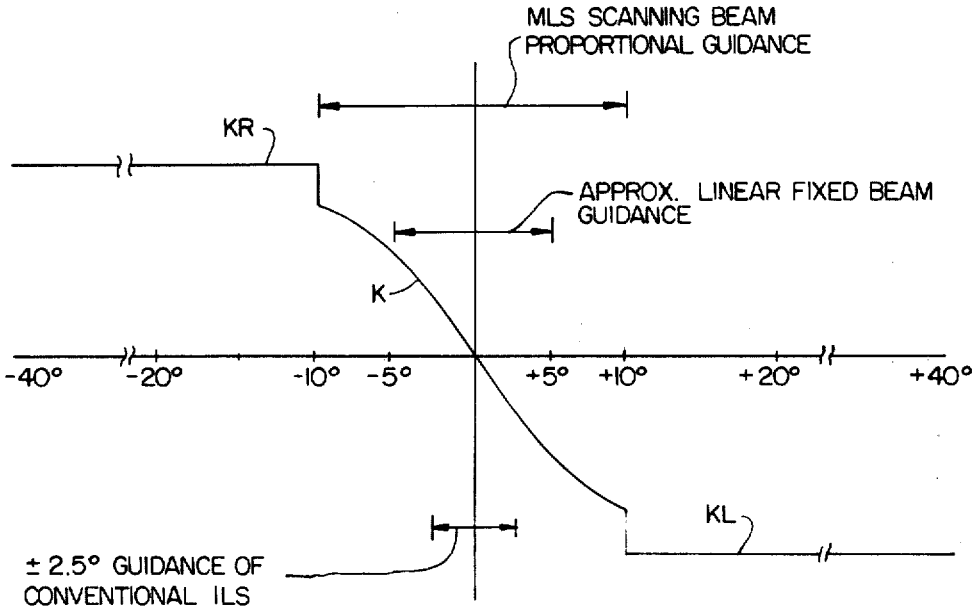

FIG. 13 shows a curve K which is similar to curve P in FIG. 12 in over-all appearance, but represents my fixed beam guidance system response. Less of the contour of the curve K beyond the centerline 36 is linear, the linear portion encompassing less than about 5° each side of the centerline, for instance for aircraft approaching between the points 96 and 97 as shown in FIG. 11A. However, useful guidance is still given in the zones between the 5° and the 10° displacements off centerline 36. The clearance beams are also provided by the antennas 77 and 78 of FIG. 10A to produce Fly-Left or Fly-Right indications as shown at KR and KL, just as in the case of FIG. 12. A fixed beam guidance curve for elevation (not shown) would have a contour similar to the azimuth curve given in FIG. 13. A comparison of FIGS. 12 and 13 shows that a scaled-down system which uses only my fixed beam guidance system, and eliminates scanning beams, gives results which are comparable with those of the full MLS system, and which are quite adequate for small airport use. It is pertinent to note that the ILS landing system, as used for many years at large airports, provides similar guidance in its proportional display for only about 2½° each side of the centerline, with the needles of the cockpit display pegged for positions beyond 2½° from the centerline to provide Fly-Left and Fly-Right instructions to the pilot.

The above discussions show that the standard MLS system, the MLS system augmented to include my fixed beam monitoring system, and the scaled-down system using my fixed beam guidance in place of scanning guidance signals are all mutually compatible, and can all be interchangeably used at airports around the world, the different systems merely requiring appropriate programming of the ground radiation control logic 71 and the ground data encoder 73 to indicate which type of system is at a particular location, and requiring appropriate programming in the airborne data processor 94 to cooperate with the different ground installations. The discussions also show that my fixed beam system, while using the same ground transmitter 70 as the MLS system, uses different antennas and operates differently and at different times in the MLS radiation sequence, and therefore operates independently to a large extent of the MLS scanning beam system when serving to monitor the latter.

This invention is not to be limited to the exact embodiments shown in the drawings, for obviously, changes may be made within the scope of the following claims.

I claim:

1. The method of providing MLS aircraft landing guidance and independently monitoring the accuracy of that MLS guidance for a prescribed approach path by transmitting from ground based antenna means in a repeating sequence of allocated MLS time intervals plural diverse guidance functions respectively including scanning beam precision landing guidance functions interspersed with fixed-beam precision guidance functions, including the steps of:

(a) scanning said scanning beam in first and second opposed directions across an approach region including the prescribed approach path to provide said scanning beam function, the scanning beam being transmitted within its own allocated MLS time intervals in the sequence and starting and stopping on opposite sides of the prescribed approach path;

(b) transmitting during non-interfering MLS time intervals fixed-beam guidance beams paired along opposite sides of the prescribed approach path such that the radiation patterns of the paired beams overlap the prescribed approach path by the same amount to provide said fixed beam function, whereby their intensities as measured along the prescribed approach path are mutually equal;

(c) receiving in an approaching aircraft said transmitted guidance beams to provide received signals;

(d) processing the signals received from the scanning beam guidance function to provide a first output signal which varies in proportion to the time between the reception in the aircraft of the scanning beam passing in said first direction and the reception of the scanning beam passing in the second direction at the present location of the aircraft, and using such first output signals to generate scanning beam guidance signals with respect to the prescribed approach path;

(e) processing the signals received from the paired fixed-beam guidance function by comparing their relative amplitudes to provide a second output signal which varies in proportion to the relative strengths thereof as received at the present location of the aircraft, and using such second output signals to generate fixed beam guidance signals with respect to the prescribed approach path; and (f) comparing said first output signals and said second output signals, and providing for aircraft guidance said scanning beam guidance signals when the first and second output signals substantially agree.

2. The method as claimed in claim 1, including the steps of transmitting in association with said guidance functions identifying data functions operative to indicate the type of guidance functions being transmitted, whereby to indicate in the aircraft how received signals should be processed.

3. The method as claimed in claim 2, including the steps of alternatively transmitting said scanning beam guidance functions and said fixed-beam guidance functions in azimuth orientation and in elevational orientation.

4. The method as claimed in claim 2, wherein the system includes MLS OCI (out-of-course indication) beams transmitted in out-of-course sectors other than said approach region at MLS specified amplitudes for the OCI beams whose amplitudes are greater than any guidance beam amplitude in the out-of-coverage sectors and which are at least 5 dB less than the scanning beam amplitude within the scanning beam region, and said OCI beams being shaped and directed to enter the approach region and overlap with equal beam intensity said prescribed approach path, said paired OCI beams providing said fixed-beam guidance signals in the aircraft.

5. The method as claimed in claim 2, wherein for azimuth guidance the system includes MLS clearance beams transmitted in clearance sectors adjacent to the scanning beams approach region at MLS specified amplitudes such that each clearance beam amplitude exceeds the other clearance beam amplitude in the clearance sector of the other clearance beam by 15 dB and it exceeds the side lobe amplitudes of the scanning beam by at least 5 dB in its clearance sector and such that each clearance beam amplitude is at least 5 dB below the scanning beam amplitude at the edge of the scanning beam region, and said clearance beams entering the approach region and overlapping said prescribed approach path with equal beam intensity and providing said fixed-beam guidance signals in the aircraft.

6. The method as claimed in claim 2, wherein said fixed beam guidance beams are transmitted respectively within MLS intervals of time allocated to the transmission of the MLS scanning beam function but outside times actually used for the MLS scanning beam transmissions.

7. The method as claimed in claim 2, wherein the MLS includes an auxiliary guidance function time interval allocated for future MLS system growth, and wherein each fixed-beam guidance beam is transmitted during an MLS auxiliary guidance function time interval.

8. In [an MLS] *a* landing system having ground located transmitting means and having MLS airborne receiving and processing means and having a repeating sequence of time intervals for accommodating plural diverse guidance functions which are transmitted in association with data identifying the type of function being transmitted, the possible guidance functions including scanning beam guidance functions comprising scanning beams scanned in first and second directions across a region which an aircraft is approaching for landing and including fixed beam guidance functions paired to overlap within the approach region along a prescribed approach path where their mutual intensities are equal, the method of providing instrument landing guidance within aircraft including the steps of:

(a) receiving guidance function beams in the aircraft and providing output signals based thereon;

(b) processing the data associated with the output signals to determine the type of guidance function, as between scanning beam guidance function only, fixed beam guidance function only, and both scanning beam and fixed beam guidance functions; and (c) processing the output signals appropriately as determined by the data associated therewith, and providing in the aircraft guidance signals which are based upon a single type of guidance function when only one type of guidance function is being transmitted, and which are based upon a comparison of both types of guidance functions when both types of guidance functions are being transmitted.

9. The method as claimed in claim 8, including the steps of alternately transmitting guidance functions in azimuth orientation and in elevation orientation, each accompanied by associated identifying data.

10. The method as claimed in claim 8, including the steps of transmitting during said repeating time sequences sector and preamble data for providing ground station identification and for use in the aircraft for signal acquisition and timing purposes.

11. The method as claimed in claim 8, wherein the system includes MLS OCI (out-of-course indication) beams transmitted in out-of-course sectors other than said approach region at MLS specified amplitudes for the OCI beams whose amplitudes are greater than any guidance beam amplitude in the out-of-course sectors and which are at least 5 dB less than the scanning beam amplitude when radiated within the scanning beam region, and said OCI beams being shaped and directed to enter the approach region and overlap with equal beam intensity said prescribed approach path, said paired OCI beams providing said fixed-beam guidance signals in the aircraft.

12. The method as claimed in claim 8, wherein for azimuth guidance the system includes MLS clearance beams transmitted in clearance sectors adjacent to the scanning beam approach region at MLS specified amplitudes such that each clearance beam amplitude exceeds the other clearance beam amplitude in the clearance sector of the other clearance beam by 15 dB and it exceeds the side lobe amplitudes of the scanning beam when radiated by at least 5 dB in its clearance sector and such that each clearance beam amplitude is at least 5 dB below the scanning beam amplitude when radiated as measured at the edge of the scanning beam region, and said clearance beams entering the approach region and overlapping said prescribed approach path with equal beam intensity and providing said fixed-beam guidance signals in the aircraft.

13. The method as claimed in claim 8, wherein said fixed beam guidance beams are transmitted respectively within MLS intervals of time allocated to the transmission of the MLS scanning beam function but outside times actually used for the MLS scanning beam transmissions.

14. The method as claimed in claim 8, wherein the MLS includes an auxiliary guidance function time interval allocated for future MLS system growth, and wherein each fixed-beam guidance beam is transmitted during an MLS auxiliary guidance function time interval.

15. Apparatus for providing MLS aircraft landing guidance and independently monitoring the accuracy of that guidance for an aircraft approaching along a prescribed path in an approach region, the apparatus transmitting from ground station means to airborne receiver means during repeating sequences of allocated MLS time intervals plural diverse guidance functions respectively including scanning beam guidance functions interspersed with fixed-beam guidance functions, the apparatus comprising:

(a) at said ground station means, transmitter means selectively connected by radiation control logic means to ground based antenna means and operative for transmitting a scanning beam guidance function in its own time intervals which is radiated into said approach region and including a scanning beam scanning in first and second directions across said approach region, and for transmitting during non-interfering time intervals fixed-beam guidance functions including paired beams directed along opposite sides of the aircraft approach path such that the paired beams overlap said prescribed approach path by the same mount, whereby their beam intensities as measured along the path are mutually equal; and (b) in said aircraft, receiver means coupled to programmed data processor means connected to landing guidance means, the receiver means being operative to receive signals based on guidance beam functions, and the processor means being operative to process the received signals based on the scanning beam function to provide a first output signal which varies in proportion to the time between the reception of the scanning beam passing in the first and second directions at the present location of the aircraft, and the processor means being operative to process received signals based on the fixed-beam guidance function by comparing their relative amplitudes to provide a second output signal which varies in proportion to the relative strengths of paired fixed-beam signals at the present location of the aircraft, and the processor means being operative to compare the first and second output signals and to deliver to the landing guidance means a guidance signal based on the first output signal when said first and second output signals substantially agree.

16. The apparatus as claimed in claim 15, wherein said transmitter means includes data encoder means enabled by the radiation control logic means to deliver to the transmitter means identifying data for radiation to the aircraft to indicate the types of guidance functions being transmitted, and said airborne data processor means being responsive to the nature of identifying data received and being rendered operative thereby to appropriately process received signals.

17. The apparatus as claimed in claim 16, wherein said radiation control logic means is alternatively actuated by said transmitter means to radiate said scanning beam guidance function and said fixed-beam guidance function in azimuth orientation and in elevational orientation, each associated with transmitted identifying data.

18. The apparatus as claimed in claim 16, wherein said radiation control logic means is operative to actuate the transmitter means and antenna means to radiate MLS OCI (out-ot-course indication) beams transmitted in out-of-course sectors other than said approach region at MLS specified amplitudes of the OCI beams which amplitudes are greater than any guidance beam amplitude in the out-of-course sectors and which are at least 5 dB less than the scanning beam amplitude within the scanning beam region, and means for shaping and directing said OCI beams to enter the approach region and overlap with equal beam intensity said prescribed approach path, said paired OCI beams providing said fixed-beam guidance signals in the aircraft.

19. The apparatus as claimed in claim 16, wherein for azimuth guidance said radiation control logic means is operative to actuate the transmitter means and antenna means to radiate MLS clearance beams adjacent to the scanning beam at MLS specified amplitudes such that each clearance beam amplitude exceeds the other clearance beam amplitude in the clearance sector of the other clearance beam by 15 dB and it exceeds the side lobe amplitudes of the scanning beam by at least 5 dB in its clearance sector and such that each clearance beam amplitude is at least 5 dB below the scanning beam amplitude at the edge of the scanning beam approach region; and means for shaping and directing said clearance beams to enter the approach region and overlap with equal beam intensity at said prescribed approach path and provide said fixed-beam guidance signals in the aircraft.

20. The apparatus claimed in claim 16, wherein said radiation control logic means is operative to actuate the transmitter means and antenna means to radiate the overlapped fixed-beam guidance beams within intervals of time allocated to the transmission of the MLS scanning beam function but outside times actually used for the MLS scanning beam transmissions.

21. The apparatus claimed in claim 16, wherein the MLS includes an auxiliary guidance function time interval allocated to future growth of the MLS system, and wherein said radiation control logic means is operative to actuate the transmitter means and antenna means to radiate the fixed beam guidance beams during MLS auxiliary guidance function time intervals.

22. In an MLS landing system having multiple differently functioning ground stations for providing landing guidance for an aircraft approaching a station along a prescribed path in an approach region and wherein the ground station transmits diverse aircraft guidance functions to airborne receiver means in a repeating sequence of allocated MLS time intervals and transmits with said guidance functions associated data functions defining the types of guidance functions transmitted at that MLS ground station, improved MLS apparatus wherein:

(a) the various MLS ground stations comprise transmitter means selectively connected by radiation control logic means to ground based antenna means which are selectively operable for transmitting at least one of diverse precision guidance functions in allocated time intervals in said sequence, which functions include a scanning beam guidance function radiated into said approach region and including a scanning beam scanned in first and second directions across said approach region, and which functions include fixed-beam guidance functions having paired beams directed along opposite sides of the aircraft approach path such that the paired beams overlap said prescribed approach path by the same amount, whereby their beam amplitudes as measured along the path are mutually equal; and (b) the airborne MLS receiver means include means operative to receive transmitted functions and include programmed data processor means connected to the receiver means and operative in response to received data signals to process received guidance signals in the manner determined by associated data signals; the processor means being operative to process precision scanning beam signals to provide output signals which vary in proportion to the time between the passing of the scanning beams in said first and second directions at the present location of the aircraft; and the processor means being operative to process paired fixed-beam guidance signals by comparing their relative amplitudes to provide output signals which vary in proportion to the relative strengths of the fixed-beam received signals at the present location of the aircraft, and landing guidance means connected to the processor means and operative to receive a guidance signal based on one of said output signals;

(c) said processor means delivering to the landing guidance means guidance signals which are based upon a single type of guidance function when only one type of guidance function is being transmitted, and which are based upon a selected one of the guidance signals after a comparison of both types of signals when both types of guidance functions are being transmitted.

23. The apparatus as claimed in claim 22, wherein said radiation logic control means is operative to actuate the transmitter means and the antenna means alternatively to radiate said guidance functions in azimuth orientation and in elevational orientation, each in association with identifying data.

24. The apparatus as claimed in claim 22, wherein said radiation control logic means is operative to actuate the transmitter means and antenna means to radiate MLS OCI (out-of-course indication) beams transmitted in out-of-course sectors other than said approach region at MLS specified amplitudes of the OCI beams which amplitudes are greater than any guidance beam amplitude in the out-of-course sectors and which are at least 5 dB less than the scanning beam amplitude within the scanning beam region, and means for shaping and directing said OCI beams to enter the approach region and overlap with equal beam intensity said prescribed approach path, said paired OCI beams providing said fixed-beam guidance signals in the aircraft.

25. The apparatus as claimed in claim 22, wherein for azimuth guidance said radiation control logic means is operative to actuate the transmitter means and antenna means to radiate MLS clearance beams adjacent to the scanning beam when radiated at MLS specified amplitudes such that each clearance beam amplitude exceeds the other clearance beam amplitude in the clearance sector of the other clearance beam by 15 dB and it exceeds the side lobe amplitudes of the scanning beam when radiated by at least 5 dB in its clearance sector and such that each clearance beam amplitude is at least 5 dB below the scanning beam amplitude when radiated at the edge of the scanning beam approach region; and means for shaping and directing said clearance beams to enter the approach region and overlap with equal beam intensity at said prescribed approach path and provide said fixed-beam guidance signals in the aircraft.

26. The apparatus claimed in claim 22, wherein said radiation control logic means is operative to actuate the transmitter means and antenna means to radiate the overlapped fixed-beam guidance beams within intervals of time allocated to the transmission of the MLS scanning beam function but outside times actually used for the MLS scanning beam transmissions.

27. The apparatus claimed in claim 22, wherein the MLS includes an auxiliary guidance function time interval allocated to future growth of the MLS system, and wherein said radiation control logic means is operative to actuate the transmitter means and antenna means to radiate the fixed beam guidance beams during MLS auxiliary guidance function time intervals.

*28. A method of providing guidance for an aircraft along a path said aircraft having means for accommodating plural diverse guidance beam functions that are transmitted in association with data identifying the type of function being transmitted, said function including fixed beams that are paired to overlap along a guidance path where their mutual intensities are equal and MLS scanning beams comprising the steps of:*

*(a) receiving guidance beam functions in said aircraft to provide output signals representative thereof;*

*(b) processing the data associated with said output signals to determine whether said received guidance beam function includes fixed beams or scanning beams; and*

*(c) processing said output signals in accordance with the determined type of guidance beam function to provide aircraft guidance signals based upon said guidance beam functions.*

*29. The method of providing guidance for an aircraft as recited in claim 28, wherein said fixed beams are transmitted respectively within MLS intervals of time allocated to the transmission of the MLS scanning beam function but outside of times actually used for the MLS scanning beam transmissions.*

*30. The method of providing guidance for an aircraft as recited in claim 28, wherein said fixed beams are transmitted during an MLS auxiliary guidance function time interval allocated for future MLS system growth.*

*31. The method of providing guidance for an aircraft as recited in claim 28, wherein said transmitting means transmits MLS OCI beams shaped to overlap said path with equal beam intensity to provide said fixed beam signals.*

*32. The system for guiding an aircraft along a path as recited in claim 28 wherein said transmitting means transmits MLS clearance beams, said clearance beams overlapping said path with equal beam intensity to provide said fixed beam signals.*

*33. A method of providing guidance for an aircraft along a path, said aircraft having means for receiving a plurality of guidance beam functions including MLS scanning beam guidance functions and means for processing said guidance beam functions to guide said aircraft along said path comprising:*

*transmitting a preamble signal including a function identification code identifying a fixed beam guidance function;*

*transmitting a fixed beam guidance function subsequent to the transmission of said preamble, said fixed beam guidance function including at least one pair of fixed beam signals overlapping along a desired guidance path;*

*receiving said transmitted signals in said aircraft; and*

*processing said fixed beam signals in accordance with said preamble signal by comparing the relative intensities of said fixed beam signals to provide a guidance signal to guide said aircraft relative to said path.*

*34. A method of providing guidance for an aircraft as recited in claim 33 wherein said step of transmitting said preamble signal includes the step of transmitting a continuous wave carrier signal.*

*35. A method of providing guidance for an aircraft as recited in claim 33 wherein said step of transmitting said preamble signal includes the step of transmitting a receiver reference time synchronization code.*

*36. A method of providing guidance for an aircraft as recited in claim 33 wherein said step of transmitting said preamble signal includes the step of transmitting a continuous wave carrier signal followed by a receiver reference time synchronization code followed by said function identification code.*

*37. A system for guiding an aircraft along a path, said aircraft having means for receiving a plurality of guidance beam functions including MLS scanning beam guidance functions and means for processing said guidance beam functions to guide said aircraft along said path, comprising:*

*means for transmitting a fixed beam guidance beam function having an identification code to identify said fixed beam guidance beam function signal and paired fixed beam signals with radiation patterns that over-*

*lap along said path such that the intensities of said signals are measured along said path are equal; and*

*means included in said aircraft processing means and responsive to said identification code for processing said fixed beam signals by comparing the relative intensities of said signals to guide said aircraft along said path.*

*38. The system for guiding an aircraft along a path as recited in claim 37 wherein said transmitting means transmits MLS OCI beams shaped to overlap said path with equal beam intensity to provide said fixed beam signals.*

*39. The system for guiding an aircraft along a path as recited in claim 37 wherein the system includes an auxiliary guidance function time interval allocated for future growth and wherein each fixed-beam guidance beam function is transmitted during an auxiliary guidance function time interval.*

*40. The system for guiding an aircraft along a path as recited in claim 37, wherein said transmitting means transmits MLS OCI beams shaped to overlap said path with equal beam intensity to provide said fixed beam signals.*

*41. The system for guiding an aircraft along a path as recited in claim 37 wherein said transmitting means transmits MLS clearance beams, said clearance beam overlapping said path with equal beam intensity to provide said fixed beam signals.*

*42. A system for guiding an aircraft along a path, said aircraft having means for receiving a plurality of guidance beam functions including MLS scanning beam guidance functions and means for processing said guidance beam functions to guide said aircraft along said path comprising:*

*means for transmitting a fixed beam guidance beam function having a preamble signal encoded with an identification code to identify said fixed-beam guidance beam function and paired, fixed beam signals with radiation patterns that overlap said path such that the intensities of said signals as measured along said path are equal; and*

*means included in said aircraft processing means and responsive to said identification code for processing said fixed beam signals by comparing the relative intensities of said signals to guide said aircraft along said path.*

*43. The system for guiding an aircraft along a path as recited in claim 42 wherein said preamble signal includes a continuous wave carrier signal.*

*44. The system for guiding an aircraft along a path as recited in claim 42 wherein said preamble signal includes a receiver reference time synchronization code.*

*45. The system for guiding an aircraft along a path as recited in claim 42 wherein said preamble signal includes a continuous wave carrier signal followed by a receiver reference time synchronization code followed by said identification code.*

*46. In an aircraft landing guidance system having first means for transmitting a first guidance beam function, means in the aircraft for receiving guidance beam functions and means coupled to said receiving means for processing said first guidance beam function to provide first guidance output signals to guide an aircraft along a path, an independent monitoring system for monitoring the accuracy of said first guidance output signals comprising:*

*transferring in a noninterfering manner with said first guidance beam function a second guidance beam function having paired, fixed beams with radiation patterns that overlap along said path such that the intensities of said signals as measured along said path are equal;* means included in said processing means for processing a second guidance beam function received by said aircraft receiving means by comparing the relative intensities of said fixed beam signals to provide second guidance output signals to guide said aircraft along said path; and

*means for comparing said first guidance output signals and said second guidance output signals to determine whether said guidance output signals are in agreement.*

*47. An aircraft landing guidance system as recited in claim 46 including means for guiding said aircraft in accordance with either one of said first or second guidance output signals in the absence of the other of said guidance output signals.*

*48. In an aircraft landing guidance system having first means for transmitting a first guidance beam function, means in an aircraft for receiving guidance beam functions and means coupled to said receiving means for processing said first guidance beam function to provide first guidance output signals to guide an aircraft along a path, an independent monitoring system for monitoring the accuracy of said first guidance output signals comprising:*

*transmitting in a noninterfering manner with said first guidance beam function a second guidance beam function;*

*means included in said processing means for processing a second guidance beam function received by said aircraft receiving means to provide second guidance output signals to guide said aircraft along said path; and*

*means for comparing said first guidance output signals and said second guidance output signals to determine whether said guidance output signals are in agreement.*

*49. A method of providing guidance for an aircraft along a path, said aircraft having means for accommodating plural diverse guidance beam functions that are transmitted in association with data identifying the type of function being transmitted, said functions including fixed beams that are paired to overlap along a guidance path where their mutual intensities are equal, comprising the steps of:*

*(a) receiving guidance beam functions in said aircraft to provide output signals representative thereof;*

*(b) processing the data associated with said output signals to determine whether said received guidance beam function includes fixed beams; and*

*(c) processing said output signals in accordance with the determined type of guidance beam function to provide aircraft guidance signals based upon said received guidance beam function.*

* * * * *